US009145096B2

(12) United States Patent
Werthauser

(10) Patent No.: US 9,145,096 B2
(45) Date of Patent: Sep. 29, 2015

(54) SYSTEM FOR ATTACHING AN ACCESSORY SUCH AS A SNOWPLOW TO A VEHICLE

(71) Applicant: Water Works Manufacturing, LLC, Cambridge, MN (US)

(72) Inventor: Allen Neil Werthauser, Mondota Heights, MN (US)

( * ) Notice: Subject to any disclaimer, the term of this patent is extended or adjusted under 35 U.S.C. 154(b) by 171 days.

(21) Appl. No.: 13/714,012

(22) Filed: Dec. 13, 2012

(65) Prior Publication Data

US 2013/0146724 A1 Jun. 13, 2013

Related U.S. Application Data

(60) Provisional application No. 61/569,960, filed on Dec. 13, 2011.

(51) Int. Cl.
*B60R 11/00* (2006.01)
*E01H 5/06* (2006.01)

(52) U.S. Cl.
CPC ................ *B60R 11/00* (2013.01); *E01H 5/063* (2013.01); *B60R 2011/004* (2013.01); *B60R 2011/0078* (2013.01)

(58) Field of Classification Search
USPC .................... 37/231, 232; 172/272, 275, 810; 403/322.3, 325, 326, 330, 322.1, 403/322.4, 321
See application file for complete search history.

(56) References Cited

U.S. PATENT DOCUMENTS

| | | | | |
|---|---|---|---|---|
| 4,632,595 | A * | 12/1986 | Schaeff | 403/330 |
| 4,883,285 | A * | 11/1989 | Hohrman | 280/491.5 |
| 5,108,216 | A * | 4/1992 | Geyer et al. | 403/330 |
| 6,145,222 | A | 11/2000 | Curtis | |
| 6,227,755 | B1 * | 5/2001 | Hata et al. | 403/322.1 |
| 6,629,811 | B1 * | 10/2003 | Husson | 414/723 |
| 6,957,505 | B1 * | 10/2005 | Moffitt | 37/231 |
| 6,964,121 | B2 * | 11/2005 | Harris | 37/231 |
| 8,578,635 | B2 * | 11/2013 | Hill | 37/231 |
| 2007/0101620 | A1 | 5/2007 | Roy | |
| 2007/0187118 | A1 | 8/2007 | Belanger | |
| 2009/0307940 | A1 * | 12/2009 | Maas et al. | 37/231 |
| 2009/0307942 | A1 * | 12/2009 | Gamble et al. | 37/232 |
| 2013/0212913 | A1 * | 8/2013 | Despres | 37/231 |

OTHER PUBLICATIONS

Quadboss, Pile Driver Part #9380 Owner's Manual. Dated Aug. 1, 2011, Aug. 9, 2011. pp. 1-7.*

* cited by examiner

*Primary Examiner* — Matthew D. Troutman
(74) *Attorney, Agent, or Firm* — Gifford, Krass, Sprinkle, Anderson & Citkowski, P.C.; Douglas L. Wathen

(57) ABSTRACT

A system for mounting an implement onto a vehicle includes a mounting plate with a first and a second bearing surface, a locator opening and a detent-receiving opening. A mounting fixture is configured to be attached to an accessory such as a snowplow blade. The mounting fixture includes a first hook configured and disposed so as to engage the first bearing surface and a second hook configured and disposed so as to engage the second bearing surface. A locator projection extends from the mounting fixture and is configured to engage and pass through the locator opening. A detent member extends from the mounting fixture and is configured to pass through the detent-receiving opening and releasably engage the plate.

14 Claims, 9 Drawing Sheets

SYSTEM FOR ATTACHING AN ACCESSORY SUCH AS A SNOWPLOW TO A VEHICLE

CROSS REFERENCE TO RELATED APPLICATION

This application claims priority from U.S. provisional patent application Ser. No. 61/569,960, filed Dec. 13, 2011, the entire content of which is incorporated herein in its entirety.

FIELD OF THE INVENTION

This invention relates generally to attachment systems, and more particularly to a system for reversibly attaching an implement such as a snowplow blade to a vehicle, such as an ATV (all terrain vehicle), UTV (utility terrain vehicle) or other vehicle.

BACKGROUND OF THE INVENTION

Snowplows, as well as other vehicle-powered implements such as shovels, scrapers, rollers, and mowers are often used on a seasonal and/or periodic basis thereby necessitating their attachment and removal from their associated vehicles. Given that such implements are frequently used under high power/load conditions, any attachment system must be rugged and capable of transmitting and sustaining high levels of stress and strain. Furthermore, given the fact that connection of such implements to motor vehicles is frequently required under conditions of darkness and cold and in snowy, icy, or muddy environments, any such system must be relatively simple to use and maintain.

SUMMARY OF THE INVENTION

As will be described hereinbelow, the present invention is directed to systems for reversibly attaching accessories, such as snowplow blades and other such implements, to a vehicle, such as an ATV (all terrain vehicle), UTV (utility terrain vehicle) or other vehicle. Some embodiments are configured for attachment to an ATV. The systems of the present invention are simple in construction, rugged, reliable, capable of transmitting high levels of power, and easy to use. The systems of the present invention may be implemented in a number of different configurations, and some such configurations are shown herein.

A first embodiment of the present invention provides a system for mounting an implement such as a snowplow onto a vehicle. The system includes a mounting plate configured to be attached to the underside of the vehicle in a generally horizontal orientation, the mounting plate having a first and a second bearing surface defined on a first edge thereof. A locator opening is defined through the mounting plate and spaced from the bearing surfaces. A detent-receiving opening is defined through the mounting plate and spaced from the locator opening and the bearing surfaces. A mounting fixture is configured to be attached to an accessory such as a snowplow blade. The mounting fixture includes a first hook configured and disposed so as to engage the first bearing surface and a second hook configured and disposed so as to engage the second bearing surface. A locator projection extends from the mounting fixture and is configured to engage and pass through the locator opening. A detent member extends from the mounting fixture and is configured to pass through the detent-receiving opening and releasably engage the plate. The mounting fixture has a mounted position wherein the first hook engages the first bearing surface, the second hook engages the second engaging surface, the locator projection engages the locator opening and the detent member passes through the detent opening and engages the mounting plate.

DETAILED DESCRIPTION OF THE INVENTION

The present invention provides a mounting system for quickly & easily attaching an implement, such as a snowplow, to a vehicle, such as an ATV (all terrain vehicle), UTV (utility terrain vehicle) or other vehicle. The system includes a mounting plate that is affixed to the underside of the vehicle and a mounting fixture that engages and quickly connects to the mounting plate. An implement, such as a snowplow, is connected to the mounting fixture such that connecting the mounting fixture to the mounting plate connects the implement to the vehicle. The mounting plate may be permanently affixed to the motor vehicle such that the mounting fixture allows the implement to be rapidly connected to and released from the vehicle.

Figure 1:
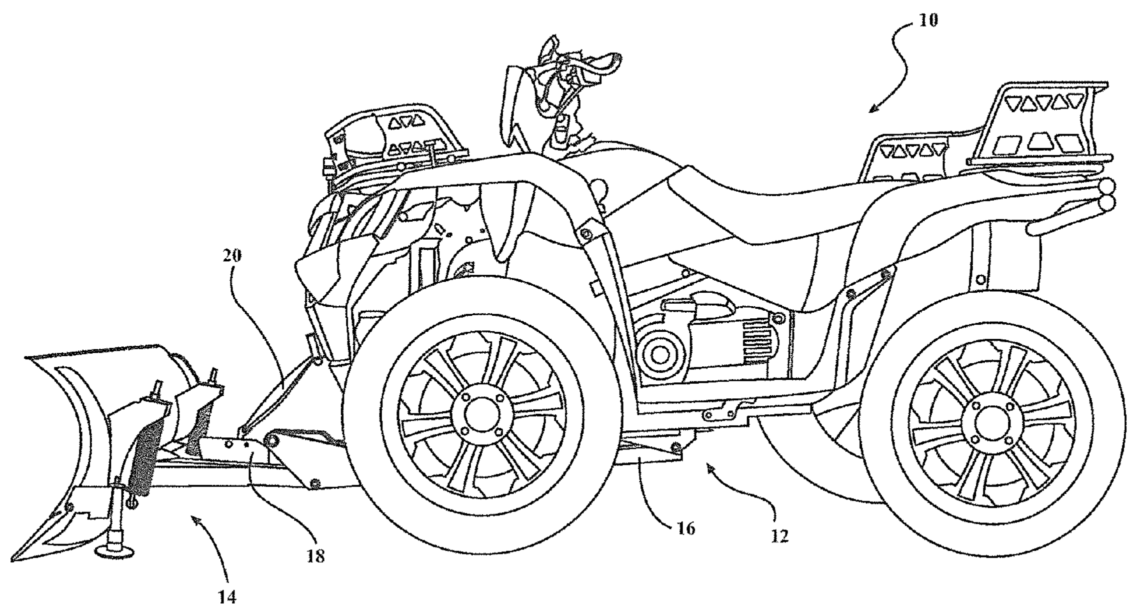
FIG. 1 is a view of a motor vehicle, specifically an ATV, with a mounting system in accordance with an embodiment of the present invention attaching a snowplow thereto.

FIG. 1 illustrates an exemplary ATV 10 with a mounting system 12 in accordance with the present invention interconnected with the underside of the ATV 10 and a snowplow 14 connected to the mounting system 12. The mounting system includes the mounting plate that interconnects with the underside of the ATV and a mounting fixture that connects to the mounting plate. In some embodiments, the mounting fixture includes a push tube assembly 16 in addition to the mounting portion of the mounting fixture that connects to the mounting plate. Various types of push tubes may be used, or some accessories may attach to the mounting fixture without a push tube. A rear end of the push tube assembly 16 is connected to the mounting portion, which connects to the mounting plate. A forward end of the push tube assembly 16 interconnects with the implement 14. In the illustrated embodiment, a lifting hook 18 is interconnected with the mid portion of the push tube assembly 16 and a winch cable 20 from the ATV interconnects with the lifting hook 18. Alternatively, the winch cable may be interconnected with the implement 14 or to other parts of the system. The winch on the ATV may be used to raise and lower the lift tube assembly 16, and therefore raise and lower the implement 14. Other approaches to lifting the lift tube assembly and/or implement may also be used, such as a manual lift, a hydraulic lift, or other approaches. In the illustrated embodiment, the winch may be used to help connect the mounting portion of the mounting fixture to the mounting plate by lifting the tube and mounting portion upwardly until the mounting portion contacts the mounting plate.

Figure 2:
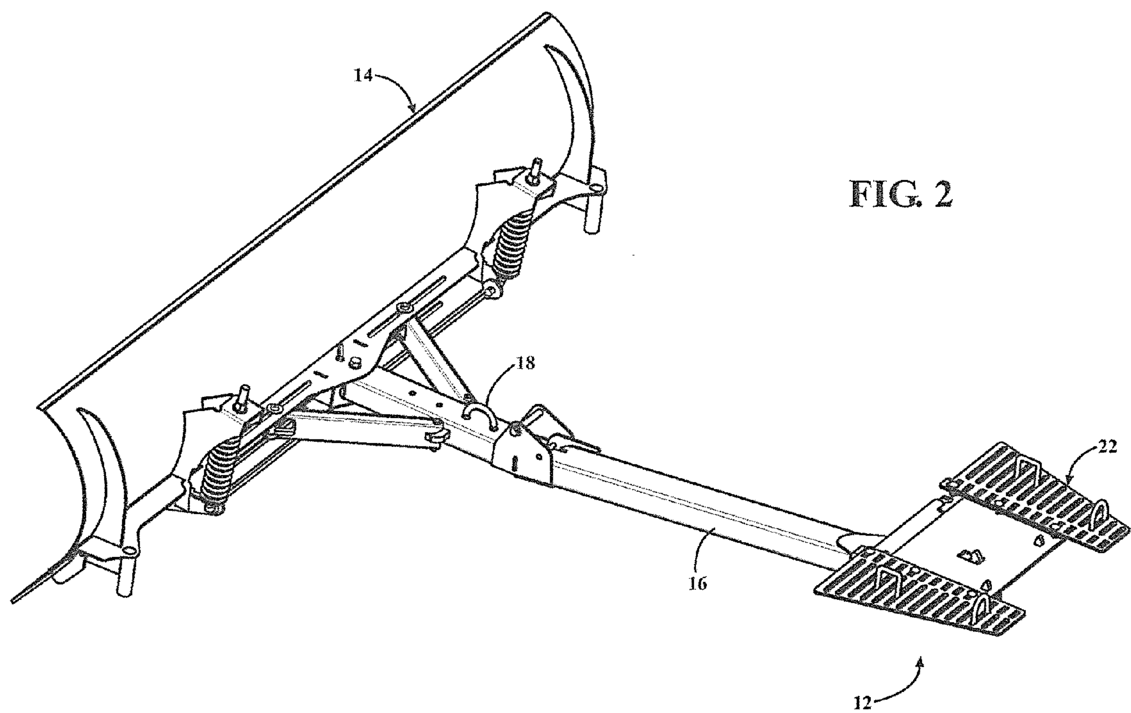
FIG. 2 is a perspective view of a mounting system in accordance with an embodiment of the present invention with a snowplow attached thereto.
Figure 3:
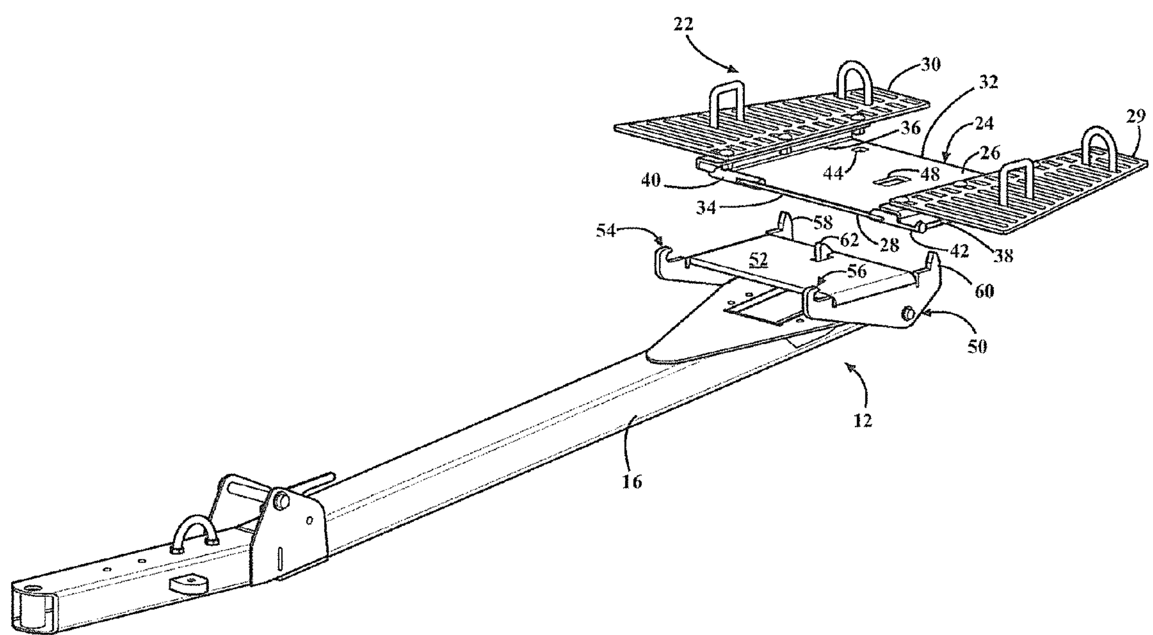
FIG. 3 is a perspective view of the mounting system of FIG. 2 with the mounting fixture detached from the mounting plate.

Referring now to FIG. 2, the mounting system 12 and implement 14 are shown without the ATV. In FIG. 3, the mounting system 12 is shown without the implement. The system 12 includes a mounting plate 22 that is configured to mount to the underside of an ATV in a generally horizontal position. In alternative embodiments, the mounting plate is designed to attach to other types of vehicles. The mounting plate 22 may take a variety of forms. In the illustrated version, a main portion 24 is generally planar with a generally planar upper surface 26 and opposed generally planar lower surface 28. Adapter portions 29 and 30 may be interconnected with the main portion 24 depending on how the plate 22 is connected to the ATV. A variety of connecting bolts are also shown for interconnecting the plate 22 with the ATV. For some vehicles, the main portion 24 of the mounting plate 22 may be bolted directly to the underside of the vehicle, while for others the adapter portions 29 and 30 may be used. When the mounting plate 22 is referred to herein, this is usually a reference to the main portion 24.

Figure 4:
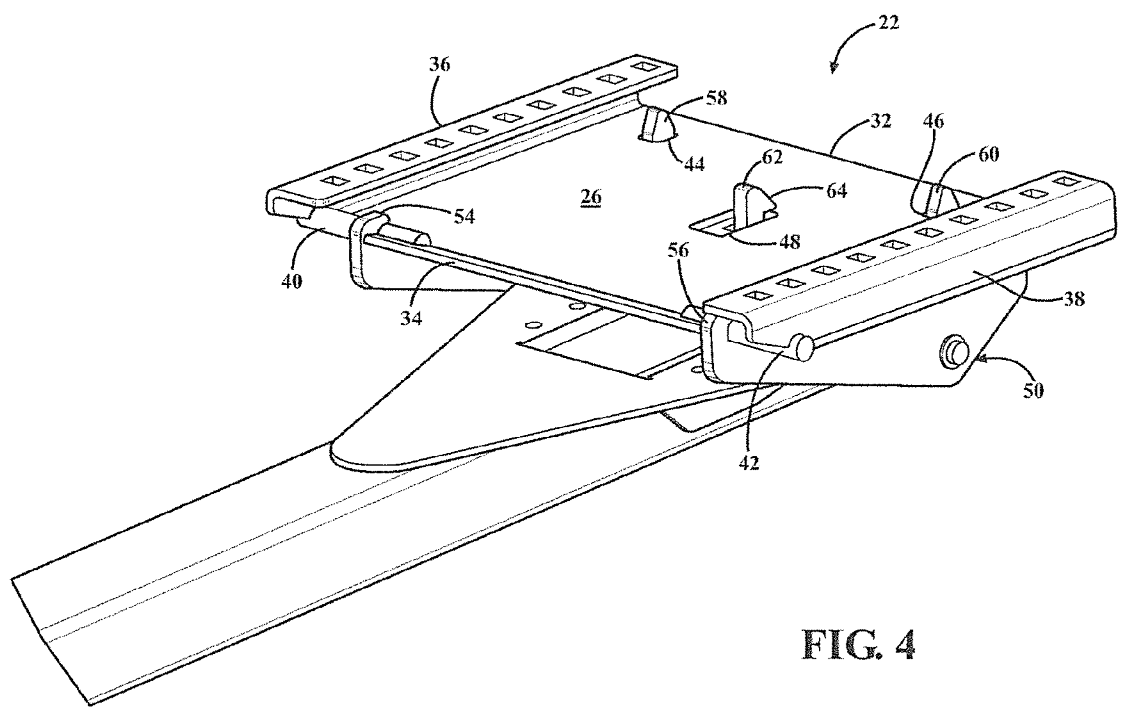
FIG. 4 is a detailed view of a portion of the mounting system.

Referring to FIGS. 3 and 4, the mounting plate 22 may be said to have a rear edge 32, an opposed front edge 34, and a pair of opposed side edges 36 and 38 extending between the front and rear edges. References to rear and front are with respect to the orientation of a vehicle onto which the system is mounted. In an alternative embodiment, the front and rear edges are reversed with respect to the orientation described herein. The mounting plate 22 has a first bearing surface 40 and a second bearing surface 42 defined on the front edge 34. Additional bearing surfaces may be provided in some versions. In some versions, these bearing surfaces are at least partially cylindrical, and may be formed out of cylindrical steel rod. In other embodiments, the bearing surfaces may be on a rear edge, other edge, in an intermediate area of the plate, or extended from the plate.

A first locator opening 44 and a second locator opening 46 are defined through the mounting plate 22. In some embodiments the openings 44 and 46 are generally proximate the rear edge 32. In some embodiments, the opening 44 is generally proximate the side edge 36 and the opening 46 is generally proximate the side edge 38, as shown. As such, the openings 44 and 46 are spaced apart from one another and spaced apart rearwardly from the bearing surfaces 40 and 42. In alternative embodiments, more or fewer locator openings may be provided and/or they may be located in different areas.

A detent-receiving opening 48 is also defined through the plate 22. In the illustrated embodiment, the opening 48 is spaced from the rear edge 32, front edge 34, and the openings 44 and 46. It is generally in a mid portion of the plate. In other embodiments, it may be located elsewhere. In alternative embodiments, additional detent-receiving openings may be provided.

Referring to FIG. 3, the mounting fixture 12 has a mounting portion 50 that interconnects with the mounting plate 22. In the illustrated embodiment, the mounting fixture 12 also includes an elongated push tube assembly 16 that is pivotally interconnected with the mounting portion 50. While the push tube assembly 16 is labeled as a push tube, this does not limit the mounting fixture and associated parts to pushing motions. In the illustrated embodiment, the mounting portion 50 has a generally planar upper surface 52. When the mounting fixture 50 is in the mounted position, as shown in FIG. 4, the upper surface 52 of the mounting portion abuts and is parallel to the lower surface 28 of the mounting plate 22. The mounting fixture includes a first hook 54 and a second hook 56. When the mounting fixture is in the mounted position, the hooks 54 and 56 engage the first and second bearing surfaces 40 and 42, respectively. In the illustrated embodiment, the hooks 54 and 56 are fixed to the mounting portion 50 of the mounting fixture 12 and have rearward facing openings. In an alternative embodiment, wherein the orientation of the mounting plate 22 is reversed and the bearing surfaces are on a rear edge, the hooks would have forward facing openings. In embodiments where the bearing surfaces are elsewhere, the hooks are positioned so as to engage the surfaces.

The mounting portion 50 may also include upwardly extending locator projections 58 and 60 that are positioned and configured to engage the locator openings 44 and 46 respectively when the mounting portion 50 is in the mounted position. As shown in FIG. 4, the locator projections may extend entirely through the planar portion of the plate 22 when in the mounted position.

The mounting portion 50 of the mounting fixture 12 further includes a detent member 62 that extends upwardly from the mounting portion 50 and is positioned and configured to pass through the detent-receiving opening 48 and engage the plate 22. In the illustrated embodiment, the detent member is a hook with a rearwardly directed tab 64 that passes above the plate so as to interconnect the plate 22 and mounting portion 50. In alternative embodiments, more than one detent member may be provided and/or the detent member may take other forms.

As will be clear to those of skill in the art, the mounting fixture 12 may be interconnected with the mounting bracket 22 by moving the mounting portion 50 upwardly and rearwardly until the hooks 54 and 56 engage the bearing surfaces 40 and 42, and then the mounting portion 50 is pivoted upwardly until the locator projections 58 and 60 pass through the locator openings 44 and 46 and the detent member 62 passes through the detent-receiving opening 48 and the tab 64 passes over the top of the plate, thus interlocking the mounting portion 50 and mounting plate 22.

Figure 5:
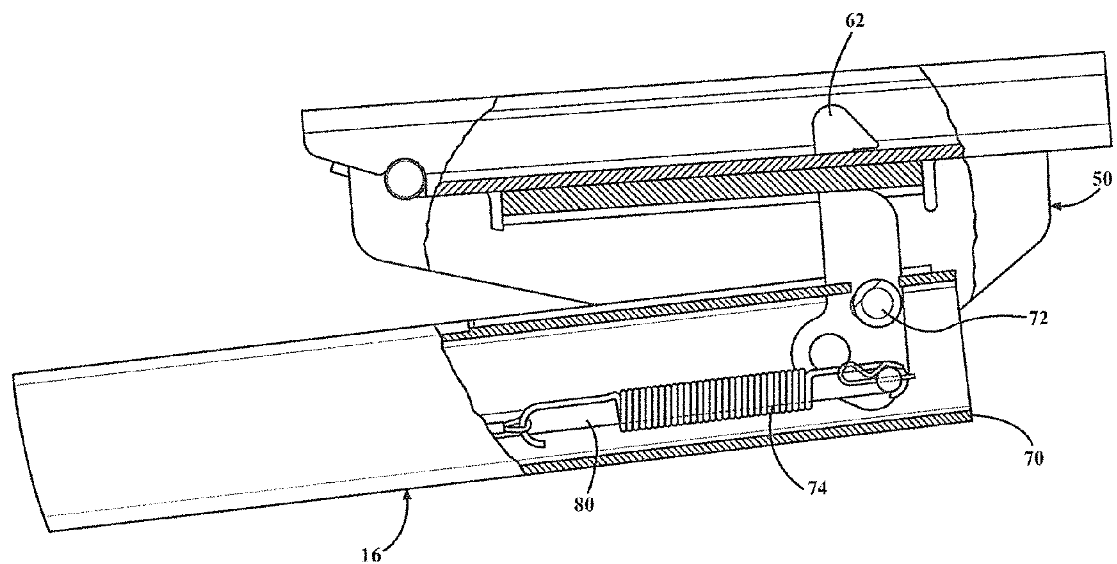
FIG. 5 is a side view of a portion of the mounting system with some of the elements cut away.
Figure 6:
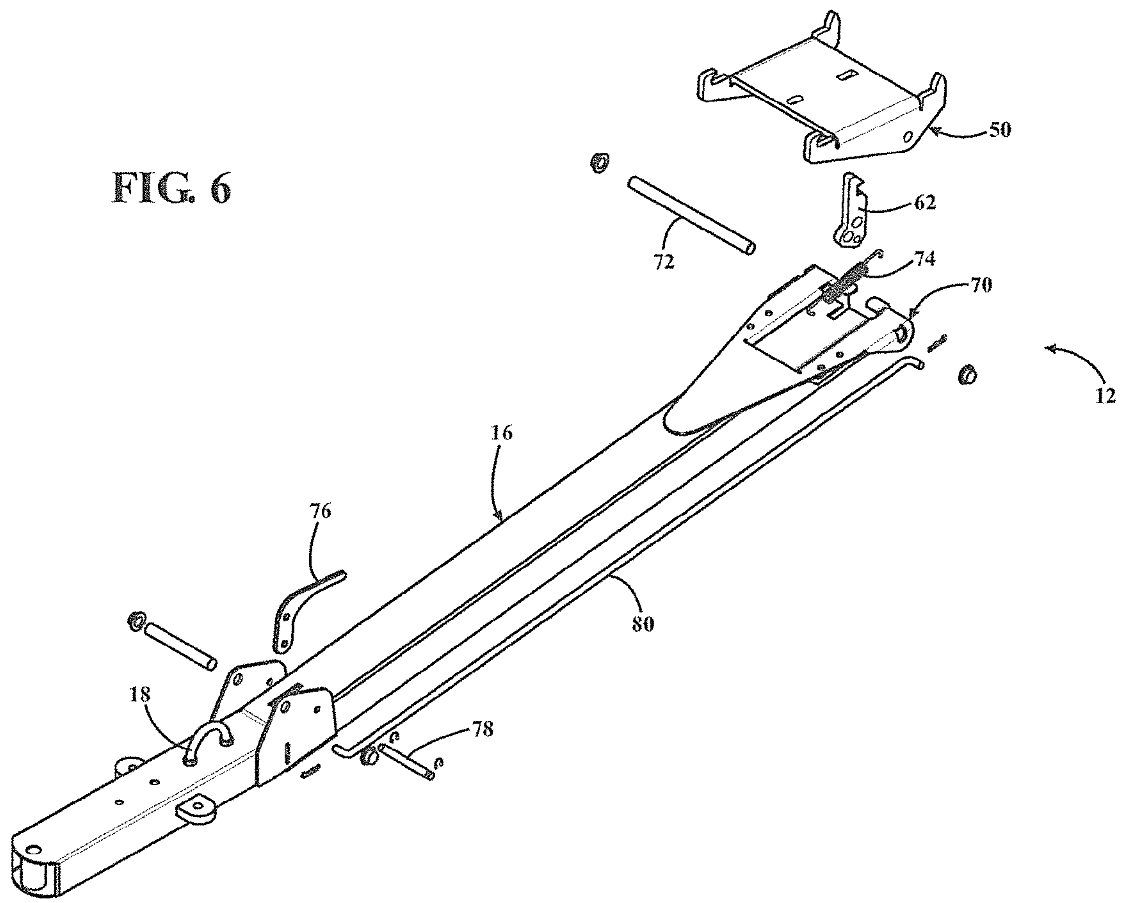
FIG. 6 is a partially exploded perspective view of a mounting system in accordance with the present invention.

Referring now to FIGS. 5 and 6, the detent mechanism will be described in more detail. FIG. 5 provides a partial cross-sectional view while FIG. 6 provides a partially exploded view. In the illustrated embodiment, the elongated push tube 16 has a rearward end 70 that is pivotally interconnected with the rest of the mounting fixture 12. A pivot pin 72 pivotally interconnects the rear end 70 of the push tube assembly 16 with the mounting portion 50. In this embodiment, the same pivot pin 72 pivotally supports the detent member 62. A spring 74 biases the detent member into the engaging position. A lever 76 is connected to the mid portion of the push tube assembly 16 and is used to disengage the detent member 62. The lever 76 is pivotally supported by a pivot pin 78 and actuates a rod 80, which in turn pivots the detent member 62 against the bias provided by the spring 74. The positioning of the lever 76 closer to the forward end of the push tube than to the rear end 70 allows an operator to easily access the lever when the mounting portion 50 is mounted to the mounting plate. This avoids the necessity of reaching under the vehicle to detach the mechanism. In alternative embodiments, activation of the detent member may also be accomplished by solenoids, hydraulics, or other such electromechanical actuators, or by different manual features, such as a cable actuation. Any form of remote actuation, mechanical or manual, may be used.

In use, a winch cable is typically attached to the lifting hook 18, or elsewhere on the system, and is used to pull the mounting portion 50 upwardly when connecting it to the mounting plate and to lower it back down after it has been disconnected, avoiding the need to manually lift the weight of the system.

Figure 7:
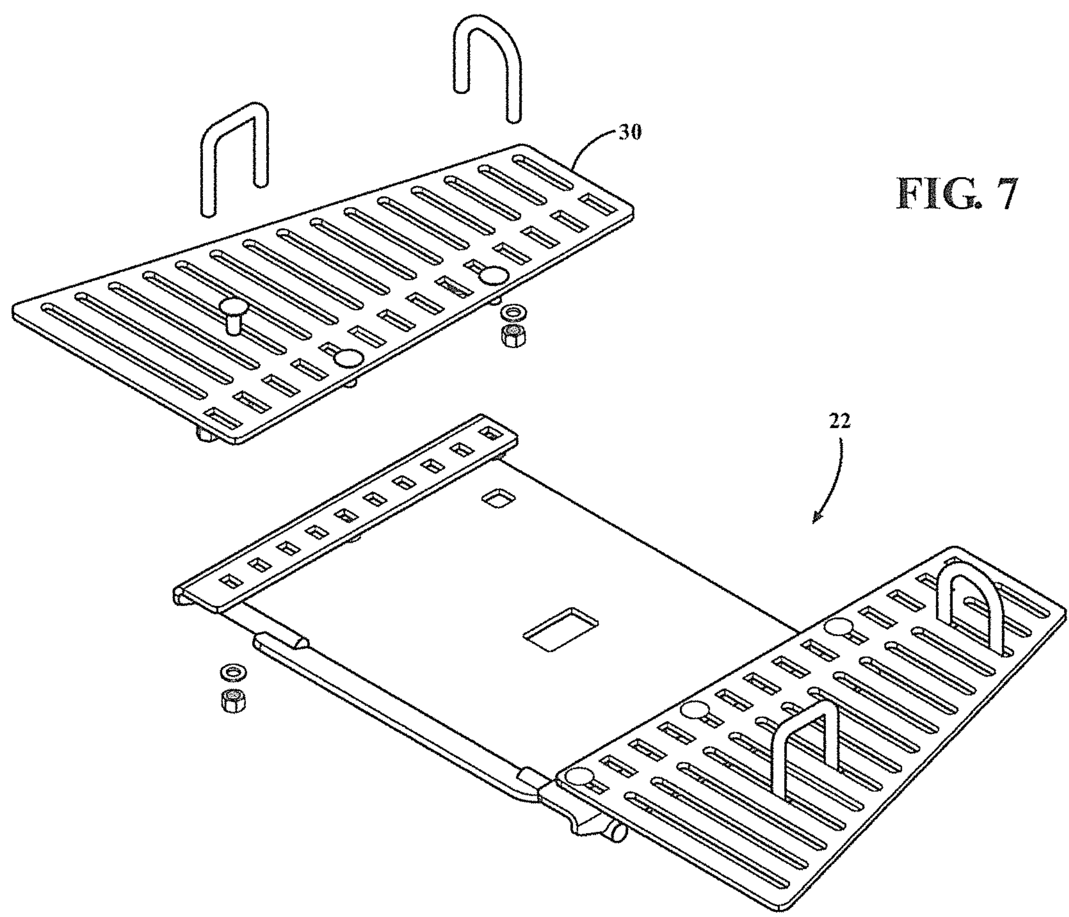
FIG. 7 is a partially exploded view of an embodiment of a mounting plate that forms part of the present invention.
Figure 8:
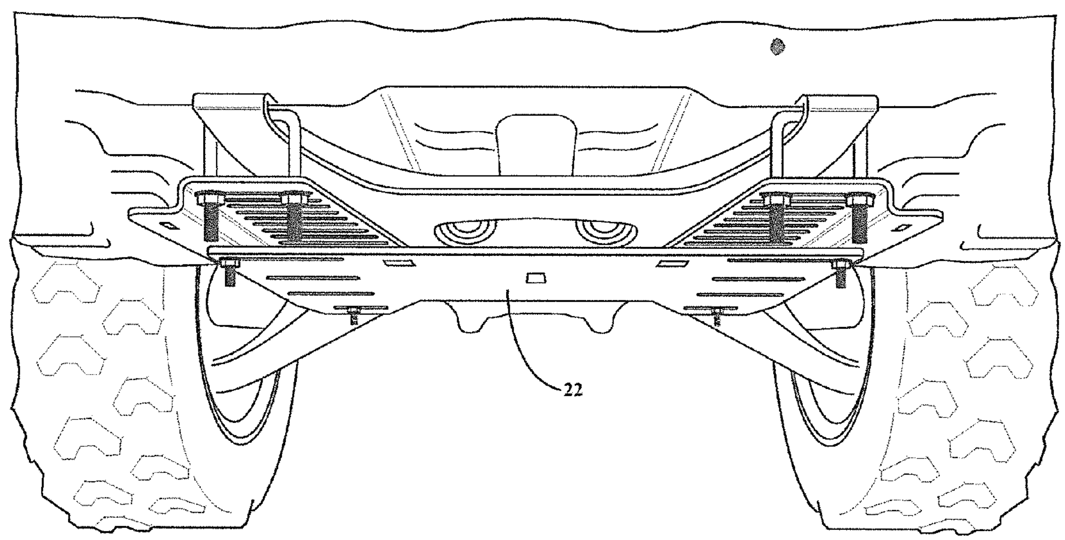
FIG. 8 is a view of a mounting plate mounted to the underside of an ATV.

Referring now to FIG. 7, the mounting plate 22 is shown with one of the side portions 30 detached therefrom so as to show the details of the assembly. FIG. 8 provides a view of the mounting plate 22 connected to frame members of an ATV such that the mounting plate is in a generally horizontal position on the underside of the ATV. The exact way in which the mounting plate is connected to the underside of the ATV depends on the configuration of the ATV. The mounting plate and side portions allow for multiple attachment approaches.

Figure 9:
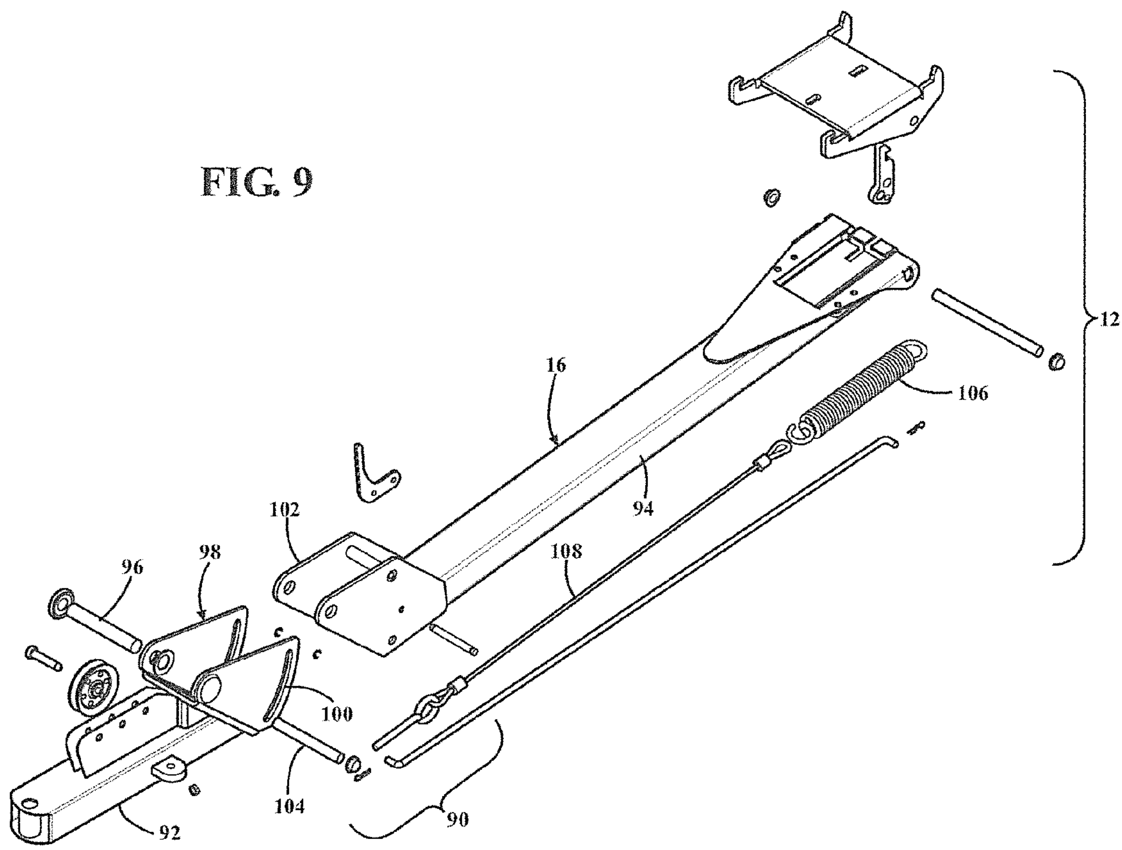
FIG. 9 is an exploded perspective view of a portion of the mounting system in accordance with the present invention.

Referring now to FIG. 9, a further exploded view of an embodiment of a mounting fixture in accordance with the present invention is shown. In this embodiment, the push tube assembly 16 includes an articulation joint 90 interconnecting a front portion 92 of the push tube 16 to a rear portion 94 of the push tube. A pivot pin 96 pivotally interconnects the front portion 92 to the rear portion 94 such that the front portion may pivot upwardly with respect to the rear portion about an axis defined by the pivot pin 96. As shown, the pivot pin is located above a longitudinal axis of the front portion 92 and of the rear portion 94. A pivot bracket 98 on the front portion 92 includes a pair of arcuate slots 100 that define travel limits for the relative position of the front portion 92 and rear portion 94. A corresponding pivot bracket 102 on the rear portion 94 interconnects with the pivot bracket 98 using the pivot pin 96 and a travel limit pin 104 engages the bracket 102 and slides in the slots 100. The articulation joint 90 is preferably spring biased to the position with the front portion 92 in its downward location, as illustrated. The spring biasing is provided by a spring 106 that is housed inside the rear portion 94 and connected with the front portion by a cable 108. The spring pulls the front portion 92 towards the rear portion 94 causing downward pivoting of the front portion 92 about the pivot pin 96. Other approaches may also be used for biasing the front and rear portions to the position shown. In some embodiments, the front portion 92 is angled slightly upwardly with respect to the rear portion 94 when the front portion is in its downward-most position.

The articulation joint 90 allows the front portion 92 of the push tube to be pivoted upwardly by the winch to increase the clearance between an implement attached to the front portion and the ground or a curb, etc. The winch pulls the tube 16 upwardly until the rear portion contacts the underside of the vehicle and then the articulation joint 90 allows the front portion to pivot relative to the rear portion to increase the travel. During use of the implement, such as for plowing, the articulation joint preferably does not articulate, and the tube acts like a non-articulating tube. In other embodiments, a rigid push tube and/or a differently shaped push tube may be used with the mounting portion of the mounting fixture.

Other modifications and variations of the foregoing system may be readily implemented. For example, the number of connector hooks, detents, projections, and the like may be varied. Likewise, the push tube assembly and associated implement may be variously configured as will be apparent to those of skill in the art.

As will be clear to those of skill in the art, the herein described embodiments of the present invention may be altered in various ways without departing from the scope or teaching of the present invention. It is the following claims, including all equivalents, that define the scope of the invention.

The invention claimed is:

1. A system for mounting an accessory onto a vehicle, the system comprising:

a mounting plate configured to be attached to the underside of the vehicle in a generally horizontal orientation, the mounting plate having a first and a second bearing surface defined thereon;

a locator opening defined through the mounting plate and spaced from the bearing surfaces;

a detent-receiving opening defined through the mounting plate and spaced from the locator opening and the bearing surfaces; and a mounting fixture configured to be attached to an accessory, the mounting fixture including a first hook configured and disposed so as to engage the first bearing surface and a second hook configured and disposed so as to engage the second bearing surface;

a locator projection extending from the mounting fixture, the locator projection configured to engage and pass through the locator opening; and a detent member extending from the mounting fixture, the detent member configured to pass through the detent-receiving opening and releasably engage the plate;

wherein the mounting fixture has a mounted position wherein the first hook engages the first bearing surface, the second hook engages the second engaging surface, the locator projection engages the locator opening and the detent member passes through the detent opening and engages the mounting plate.

2. The system of claim 1, wherein:

the first and second bearing surfaces are defined on a front edge of the plate.

3. The system of claim 1, wherein:

the locator opening is a first locator opening and the locator projection is a first locator projection;

the mounting plate further having a second locator opening defined therethrough, spaced from the first locator opening; and the mounting fixture further having a second locator projection extending therefrom, the second locator projection configured to engage and pass through the second locator opening.

4. The system of claim 3, wherein:

the mounting plate has side edges, the first locator opening being proximate one of the side edges and the second locator opening being proximate the other of the side edges.

5. The system of claim 1, wherein:

the first and second hooks are fixed to the mounting structure and have rearward facing openings.

6. The system of claim 1, wherein:

the first and second bearing surfaces are at least partially cylindrical.

7. The system of claim 1, wherein:

the mounting fixture has a generally planar upper surface and the mounting plate has a generally planar lower surface, the upper surface of the mounting fixture abutting and being parallel to the lower surface of the mounting plate when the mounting fixture is in the mounted position.

8. The system of claim 1, wherein:

the detent member is a hook;

the system further having a biasing spring urging the hook into engagement with the plate.

9. The system of claim 1, wherein:

the mounting fixture has a mounting portion that mounts to the mounting plate and further includes a push tube assembly with a rear end pivotally interconnected with the mounting portion and an opposed front end for attachment to the accessory.

10. The system of claim 9, wherein the push tube assembly has a mid portion with an articulation joint, the articulation joint allowing a portion of the push tube assembly forward of the joint to pivot upwardly with respect to a portion of the push tube assembly rearward of the joint, the push tube assembly further having a spring biasing the articulation joint such that the forward portion is biased downwardly.

11. The system of claim 9, further comprising:

a release mechanism for releasing the detent member from the plate to detach the mounting fixture from the plate, the release mechanism including a lever mounted to the push tube assembly spaced from the rear end and a linkage interconnecting the lever with the detent member.

12. A system for mounting an accessory onto a vehicle, the system comprising:

a mounting plate configured to be attached to the underside of the motor vehicle in a generally horizontal orientation, the mounting plate having a first and a second bearing surface defined on a front edge thereof;

a mounting fixture configured to be attached to an implement, the mounting fixture including a first hook configured and disposed so as to engage the first bearing surface and a second hook configured and disposed so as to engage the second bearing surface, the mounting fixture having a mounted position wherein the first hook engages the first bearing surface, the second hook engages the second engaging surface;

a locator opening defined through the mounting plate or the mounting fixture and a locator projection extending from the other of the mounting plate or the mounting fixture, the locator projection configured to engage and pass through the locator opening when the mounting fixture is in the mounted position; and a detent-receiving opening defined through the mounting plate or the mounting fixture and a detent member extending from the other of the mounting plate or the mounting fixture, the detent member configured to pass through the detent-receiving opening and releasably intercormect the mounting fixture and mounting plate in the mounted position.

13. A system for mounting an accessory onto a vehicle, the system comprising:

a mounting plate configured to be attached to the underside of the motor vehicle in a generally horizontal orientation, the mounting plate having a generally planar lower surface with a detent opening defined therethrough;

a mounting fixture configured to be attached to an accessory, the mounting fixture having a mounting portion with a generally planar upper surface, the mounting portion having a mounted position wherein the upper surface of the mounting portion abuts and is parallel to the lower surface of the mounting plate, the mounting fixture having a detent member extending therefrom, the detent member extending through the detent opening and engaging the mounting plate when the mounting portion of the mounting fixture is in the mounted position;

the mounting fixture further including a push tube assembly with a rear end pivotally interconnected with the mounting portion, an opposed front end for attachment to an implement, and a mid portion therebetween;

a release mechanism for releasing the detent member from the plate to detach the mounting fixture from the plate, the release mechanism including a lever mounted to the mid portion of the push tube assembly spaced from the rear end and a linkage interconnecting the lever with the detent member.

14. The system of claim 13, wherein:

the mid portion of the push tube assembly includes an articulation joint, the articulation joint allowing a portion of the push tube assembly forward of the joint to pivot upwardly with respect to a portion of the push tube assembly rearward of the joint, the push tube assembly further having a spring biasing the articulation joint such that the forward portion is biased downwardly.

* * * * *